(12) United States Patent
Gonzalez et al.

(10) Patent No.: US 9,754,773 B1
(45) Date of Patent: Sep. 5, 2017

(54) INTERNAL SOLVENT TRAP WITH DRAIN

(71) Applicant: Thermo Finnigan LLC, San Jose, CA (US)

(72) Inventors: David Gonzalez, Austin, TX (US); Joshua T. Maze, Round Rock, TX (US); Scott T. Quarmby, Round Rock, TX (US)

(73) Assignee: Thermo Finnigan LLC, San Jose, CA (US)

( * ) Notice: Subject to any disclaimer, the term of this patent is extended or adjusted under 35 U.S.C. 154(b) by 0 days.

(21) Appl. No.: 15/153,668

(22) Filed: May 12, 2016

(51) Int. Cl.
| | | |
|---|---|---|
| *H01J 49/26* | (2006.01) | |
| *H01J 49/04* | (2006.01) | |
| *B01D 45/08* | (2006.01) | |
| *H01J 49/10* | (2006.01) | |
| *H01J 49/02* | (2006.01) | |

(52) U.S. Cl.
CPC .......... *H01J 49/0459* (2013.01); *B01D 45/08* (2013.01); *H01J 49/025* (2013.01); *H01J 49/10* (2013.01); *H01J 49/26* (2013.01)

(58) Field of Classification Search
USPC ................................ 250/281, 282, 283, 288
See application file for complete search history.

(56) References Cited

U.S. PATENT DOCUMENTS

| | | | |
|---|---|---|---|
| 4,883,958 A | 11/1989 | Vestal | |
| 5,033,541 A | 7/1991 | D'Silva | |
| 5,308,977 A | 5/1994 | Oishi et al. | |
| 5,454,274 A | 10/1995 | Zhu | |
| 2005/0161596 A1* | 7/2005 | Guevremont | ........... H01J 49/04 250/294 |
| 2007/0158540 A1 | 7/2007 | Faubel | |
| 2010/0276589 A1* | 11/2010 | McKay | ............... H01J 49/0431 250/288 |
| 2011/0031392 A1* | 2/2011 | McEwen | ............. H01J 49/0477 250/283 |
| 2011/0174966 A1* | 7/2011 | Wollnik | .................. H01J 49/10 250/286 |
| 2011/0302994 A1 | 12/2011 | Anderson, Jr. et al. | |
| 2013/0140456 A1* | 6/2013 | Wollnik | ............... G01N 27/624 250/288 |

FOREIGN PATENT DOCUMENTS

JP        2014-190833 A      10/2014

\* cited by examiner

*Primary Examiner* — Nicole Ippolito
(74) *Attorney, Agent, or Firm* — David A. Schell

(57) ABSTRACT

A solvent trap for integration with a mass spectrometry system includes an enclosure defining an internal space; a wet gas inlet port configured to receive a gaseous flow from an ion source; a liquids outlet port configured to enable liquids to flow under gravity from the internal space; and a dry gas outlet port configured to exhaust gas from the internal space.

20 Claims, 4 Drawing Sheets

INTERNAL SOLVENT TRAP WITH DRAIN

FIELD

The present disclosure generally relates to the field of mass spectrometry including an internal solvent trap with a drain.

INTRODUCTION

Mass spectrometry is an analytical chemistry technique that can identify the amount and type of chemicals present in a sample by measuring the mass-to-charge ratio and abundance of gas-phase ions. Analysis of the gas-phase ions is typically conducted under vacuum while samples may be introduced at atmospheric pressure. In liquid chromatography mass spectrometry, an eluate from a liquid chromatography system, such as a High Performance Liquid Chromatography (HPLC) or Ion Chromatography (IC) system can be vaporized and ionized, such as by electrospray ionization, to produce the gas-phase ions. Typically, the vaporization and ionization is performed at atmospheric or near atmospheric pressures and can be accompanied by a significant gas flow. Additionally, the gas flow can include a significant volume of vaporized solvent. Removal of the solvent from the gas flow before exhausting the gas can be necessary to avoid contamination of gas handling systems and the environment with the solvent.

Typically, solvent capture has been accomplished by directing the exhaust gases to a solvent trap located on the floor adjacent to the mass spectrometry system. When combined with a liquid chromatography system, this can result in two or more collection points for excess solvent that may need disposal.

From the foregoing it will be appreciated that a need exists for improvements in solvent trapping and collection.

SUMMARY

In a first aspect, a solvent trap for integration with a mass spectrometry system can include an enclosure defining an internal space, a wet gas inlet port configured to receive a gaseous flow from an ion source, a liquids outlet port configured to enable liquids to flow under gravity from the internal space, and a dry gas outlet port configured to exhaust gas from the internal space.

In various embodiments of the first aspect, the solvent trap can further include baffles within the internal space.

In various embodiments of the first aspect, the solvent trap can further include an active cooling mechanism. In particular embodiments, the active cooling mechanism includes a thermoelectric cooler, a circulating coolant, or any combination thereof.

In various embodiments of the first aspect, the solvent trap can further include a passive cooling mechanism.

In various embodiments of the first aspect, the solvent trap can further include an inlet for a cooling gas to mix with the wet gas.

In various embodiments of the first aspect, the solvent trap can further include a coalescing media.

In various embodiments of the first aspect, the solvent trap can further include a sensor to measure a volume of accumulated liquid within the solvent trap.

In a second aspect, a mass spectrometry system can include a source configured to generate ions from a liquid sample, a mass analyzer configured to determine the mass-to-charge ratio of the ions, and a solvent trap. The solvent trap can include an enclosure defining an internal space, a wet gas inlet port configured to receive a gaseous flow from an ion source, a liquids outlet port configured to enable liquids to flow under gravity from the internal space, and a dry gas outlet port configured to exhaust gas from the internal space.

In various embodiments of the second aspect, the source can include an electrospray source, an APCI source, or a thermospray ion source.

In various embodiments of the second aspect, the solvent trap can include baffles within the internal space.

In various embodiments of the second aspect, the solvent trap can include an active cooling mechanism. In particular embodiments, the active cooling mechanism includes a thermoelectric cooler, a circulating coolant, or any combination thereof.

In various embodiments of the second aspect, the solvent trap can include a passive cooling mechanism.

In various embodiments of the second aspect, the solvent trap can include an inlet for a cooling gas to mix with the wet gas.

In various embodiments of the second aspect, the solvent trap can include a coalescing media.

In various embodiments of the second aspect, the solvent trap can include a sensor to measure a volume of accumulated liquid within the solvent trap.

In a third aspect, a method for operating a mass spectrometer can include supplying a liquid sample to an ion source, nebulizing the liquid sample, exhausting excess gases saturated with solvent from the liquid sample to an integrated solvent trap, the integrated solvent trap including an internal volume, a first gaseous inlet, a gaseous outlet, and a liquids outlet, separating at least a portion of the solvent from the excess gases within the internal volume, draining the portion of the solvent in liquid form from the internal volume by way of the liquids outlet, exhausting the excess gases from the internal value by way of the gaseous outlet.

In various embodiments of the second aspect, the method can further include actively cooling the excess gas to condense the solvent. In particular embodiments, actively cooling can include using a thermoelectric cooler, circulating a coolant, or any combination thereof.

In various embodiments of the second aspect, the method can further include measuring a volume of accumulated liquid within the solvent trap.

In various embodiments of the second aspect, the method can further include mixing the excess gases with a cooling gas to condense the solvent.

DRAWINGS

For a more complete understanding of the principles disclosed herein, and the advantages thereof, reference is now made to the following descriptions taken in conjunction with the accompanying drawings, in which.

Figure 1:
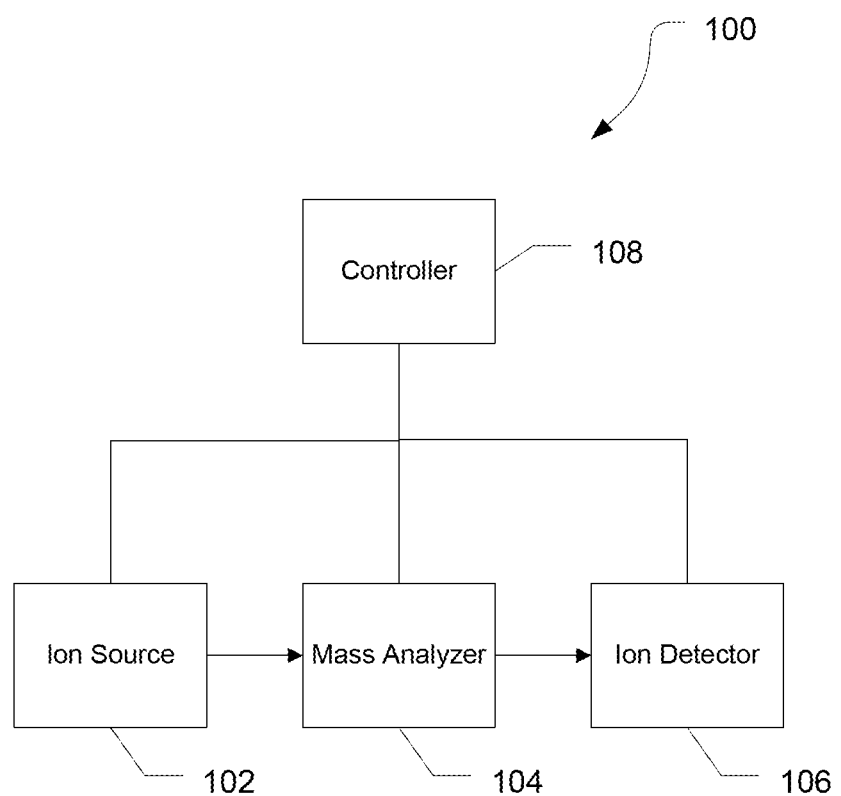
FIG. 1 is a block diagram of an exemplary mass spectrometry system, in accordance with various embodiments.

It is to be understood that the figures are not necessarily drawn to scale, nor are the objects in the figures necessarily drawn to scale in relationship to one another. The figures are depictions that are intended to bring clarity and understanding to various embodiments of apparatuses, systems, and methods disclosed herein. Wherever possible, the same reference numbers will be used throughout the drawings to refer to the same or like parts. Moreover, it should be appreciated that the drawings are not intended to limit the scope of the present teachings in any way.

DESCRIPTION OF VARIOUS EMBODIMENTS

Embodiments of systems and methods for ion separation are described herein.

The section headings used herein are for organizational purposes only and are not to be construed as limiting the described subject matter in any way.

In this detailed description of the various embodiments, for purposes of explanation, numerous specific details are set forth to provide a thorough understanding of the embodiments disclosed. One skilled in the art will appreciate, however, that these various embodiments may be practiced with or without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the various embodiments disclosed herein.

All literature and similar materials cited in this application, including but not limited to, patents, patent applications, articles, books, treatises, and internet web pages are expressly incorporated by reference in their entirety for any purpose. Unless described otherwise, all technical and scientific terms used herein have a meaning as is commonly understood by one of ordinary skill in the art to which the various embodiments described herein belongs.

It will be appreciated that there is an implied "about" prior to the temperatures, concentrations, times, pressures, flow rates, cross-sectional areas, etc. discussed in the present teachings, such that slight and insubstantial deviations are within the scope of the present teachings. In this application, the use of the singular includes the plural unless specifically stated otherwise. Also, the use of "comprise", "comprises", "comprising", "contain", "contains", "containing", "include", "includes", and "including" are not intended to be limiting. It is to be understood that both the foregoing general description and the following detailed description are exemplary and explanatory only and are not restrictive of the present teachings.

As used herein, "a" or "an" also may refer to "at least one" or "one or more." Also, the use of "or" is inclusive, such that the phrase "A or B" is true when "A" is true, "B" is true, or both "A" and "B" are true. Further, unless otherwise required by context, singular terms shall include pluralities and plural terms shall include the singular.

A "system" sets forth a set of components, real or abstract, comprising a whole where each component interacts with or is related to at least one other component within the whole.
Mass Spectrometry Platforms Various embodiments of mass spectrometry platform 100 can include components as displayed in the block diagram of FIG. 1. In various embodiments, elements of FIG. 1 can be incorporated into mass spectrometry platform 100. According to various embodiments, mass spectrometer 100 can include an ion source 102, a mass analyzer 104, an ion detector 106, and a controller 108.

In various embodiments, the ion source 102 generates a plurality of ions from a sample. The ion source can include, but is not limited to, an electrospray ionization (ESI) source, heated electrospray ionization (HESI) source, nanoelectrospray ionization (nESI) source, atmospheric pressure chemical ionization (APCI) source, atmospheric pressure photoionization source (APPI), inductively coupled plasma (ICP) source, thermospray ionization source, and other ion sources for liquid samples where gas for nebulization or other purposes is utilized. In various embodiments, the ion source can be at substantially atmospheric pressure. Alternatively, such as for sub ambient electrospray ionization, the ion source can be at sub ambient pressures, such as on the order of about $10^1$ to about $10^2$ Torr.

In various embodiments, the mass analyzer 104 can separate ions based on a mass-to-charge ratio of the ions. For example, the mass analyzer 104 can include a quadrupole mass filter analyzer, a quadrupole ion trap analyzer, a time-of-flight (TOF) analyzer, an electrostatic trap mass analyzer (e.g., ORBITRAP mass analyzer), Fourier transform ion cyclotron resonance (FT-ICR) mass analyzer, magnetic sector, and the like. In various embodiments, the mass analyzer 104 can also be configured to fragment the ions using collision induced dissociation (CID), electron transfer dissociation (ETD), electron capture dissociation (ECD), photo induced dissociation (PID), surface induced dissociation (SID), and the like, and further separate the fragmented ions based on the mass-to-charge ratio.

In various embodiments, the ion detector 106 can detect ions. For example, the ion detector 106 can include an electron multiplier, a Faraday cup, and the like. Ions leaving the mass analyzer can be detected by the ion detector. In various embodiments, the ion detector can be quantitative, such that an accurate count of the ions can be determined.

In various embodiments, the controller 108 can communicate with the ion source 102, the mass analyzer 104, and the ion detector 106. For example, the controller 108 can configure the ion source or enable/disable the ion source. Additionally, the controller 108 can configure the mass analyzer 104 to select a particular mass range to detect. Further, the controller 108 can adjust the sensitivity of the ion detector 106, such as by adjusting the gain. Additionally, the controller 108 can adjust the polarity of the ion detector 106 based on the polarity of the ions being detected. For example, the ion detector 106 can be configured to detect positive ions or be configured to detect negative ions.

Figure 2:
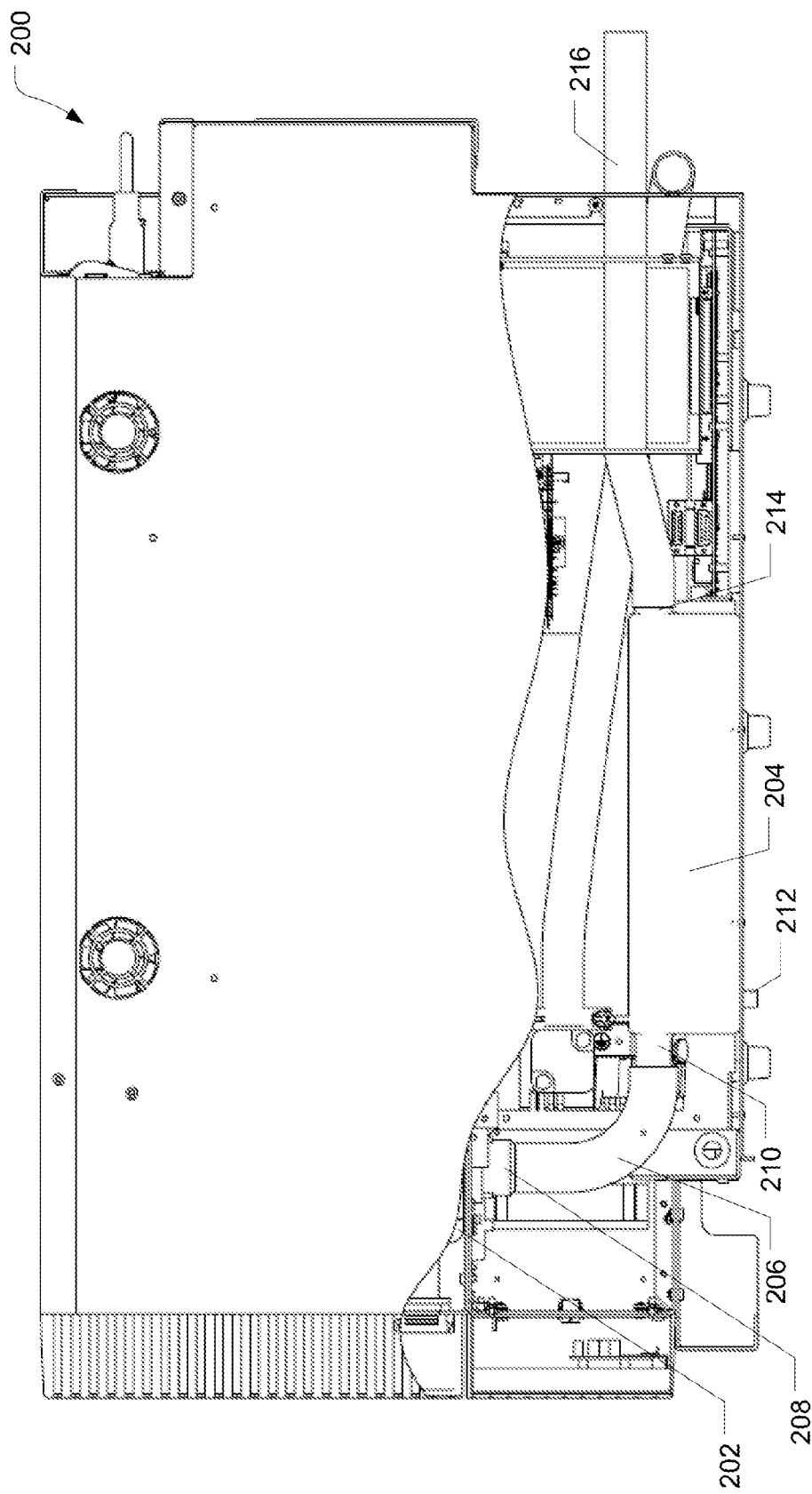
FIG. 2 is an illustration of an exemplary mass spectrometry system with an internal solvent trap, in accordance with various embodiments.

FIG. 2 illustrates a side partial cutout view of an exemplary mass spectrometry system 200. Mass spectrometry system 200 can include an ion source 202 and an internal solvent trap 204. Source exhaust tubing 206 can connect an exhaust port 208 of the ion source 202 to an inlet 210 of the internal solvent trap 204. Gases with solvent vapors from the ion source 202 can flow from the ion source 202 through the source exhaust tubing 206 to the internal solvent trap 204.

The solvent vapors can be condensed from the exhaust gases within the internal solvent trap 204. Liquid solvent can flow out drain 212. In various embodiments, drain 212 can be connected via drain tubing to a waste container or other mechanism to collect and/or dispose of the liquid solvent, such as a waste container of a liquid chromatography system connected to the mass spectrometry system. By connecting drain 212 to the waste container of a liquid chromatography system, only one waste collection may need to be periodically emptied saving time and money. Also, having only one waste container, rather than two, can save laboratory space.

Exhaust gases with at least a portion of the solvent vapors removed through condensation can flow out of the internal solvent trap 204 by way of outlet 214 to trap exhaust tubing 216. In various embodiments, trap exhaust tubing 216 can direct the exhaust gases to an appropriate air handling system, such as an exhaust fan, a fume hood, or the like, to remove the exhaust gases from a workspace.

In various embodiments, the source exhaust tubing 206 and the trap exhaust tubing 216 can be sloped to direct solvent that condenses within either of the source exhaust tubing 206 or the trap exhaust tubing 216 towards the internal solvent trap 204. In this way, solvent condensing in the tubing 206, 216 can be collected and drained to a waste container or the like. In absence of the internal solvent trap 204, exhaust tubing would need to slope downward from the ion source until exiting the system to avoid pooling of condensed solvent within the exhaust tubing.

In various embodiments, the internal solvent trap 204 can be located inside the mass spectrometer as shown in FIG. 2. Alternatively, it can be externally mounted on the mass spectrometer, such as by attaching to the back, front, or side of the mass spectrometer.

Figure 3:
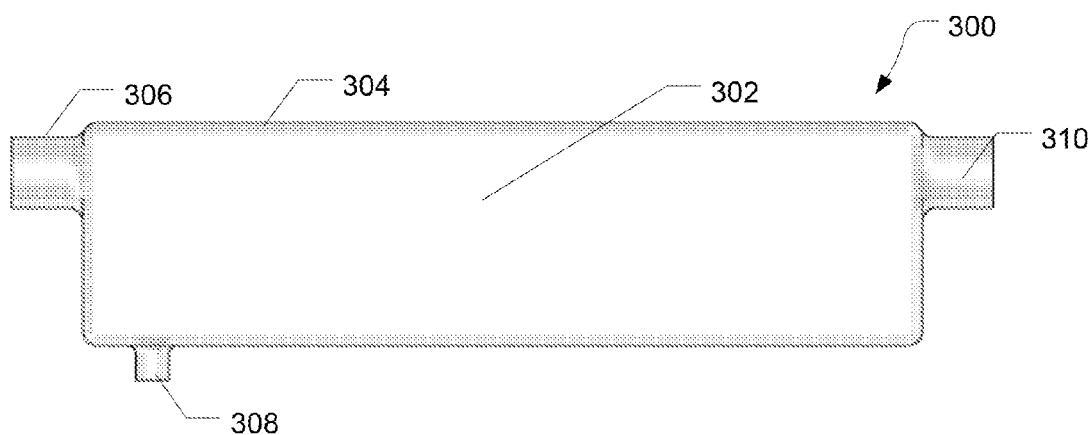
FIGS. 3 and 4 are illustrations of an internal solvent trap, in accordance with various embodiments.
Figure 4:
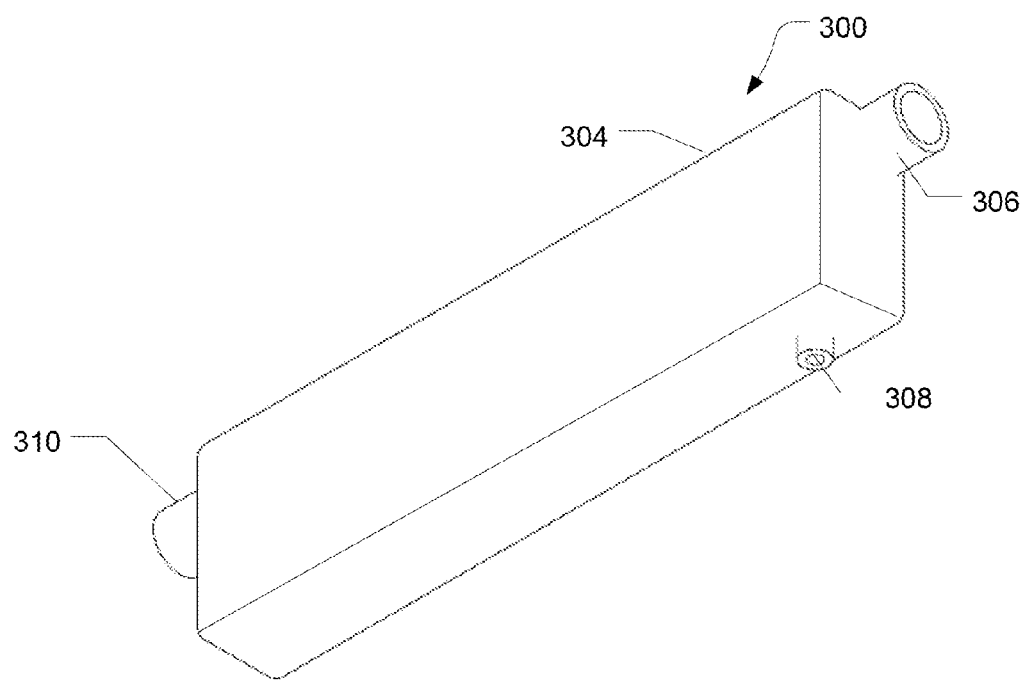

FIGS. 3 and 4 illustrate an internal solvent trap 300. Internal solvent trap 300 includes an internal space 302 defined by a housing 304. Additionally, internal solvent trap 300 can include an inlet 306, a drain 308, and an outlet 310.

In various embodiments, internal solvent trap 300 can incorporate various active and passive cooling mechanisms. This cooling mechanisms can include thermoelectric coolers, heat exchangers using a circulating a coolant, passive heat exchangers to cool the internal solvent trap, mixing the exhaust gases with cooling gases (such as air), and other cooling techniques known in the art.

In various embodiments, the internal solvent trap 300 can include baffles and other mechanisms within the internal space 302 to increase the length of the flow path within the internal solvent trap 300. Additionally, the internal solvent trap 300 can include coalescing media within the internal space 302 to provide surface area for the solvent to condense. Generally, the internal space can be configured to direct any condensed liquid towards the drain to avoid trapping liquids within portions of the trap.

In various embodiments, the outlet 310 can have an inner diameter not less than the inner diameter of the inlet 306 to avoid building pressure within the internal solvent trap 300. In some embodiments, the inner diameter of the outlet 310 can be larger than the inner diameter of the inlet 306 allowing for a pressure drop to occur within internal solvent trap 300 to aid with condensation of the solvent. Generally, the inner diameter of the exhaust tubing, such as exhaust tubing 206, 216, can be about 25 mm inner diameter, and the drain tubing can be smaller, such as about 10 mm inner diameter. However, smaller or larger inner diameters can be used in accordance with the flow requirements of the system.

In various embodiments, internal solvent trap 300 can include mechanisms to measure the accumulated liquid within the internal solvent trap 300. These can include optical level sensors, capacitance level sensors, magnetorestrictive level sensors, ultrasonic level sensors, laser level sensors, radar level sensors, and the like. These mechanisms can detect if the liquid is not draining out drain 308 perhaps because of a clog in the drain tubing. The controller can then turn off the ion source to prevent further accumulation of liquid.

Figure 5:
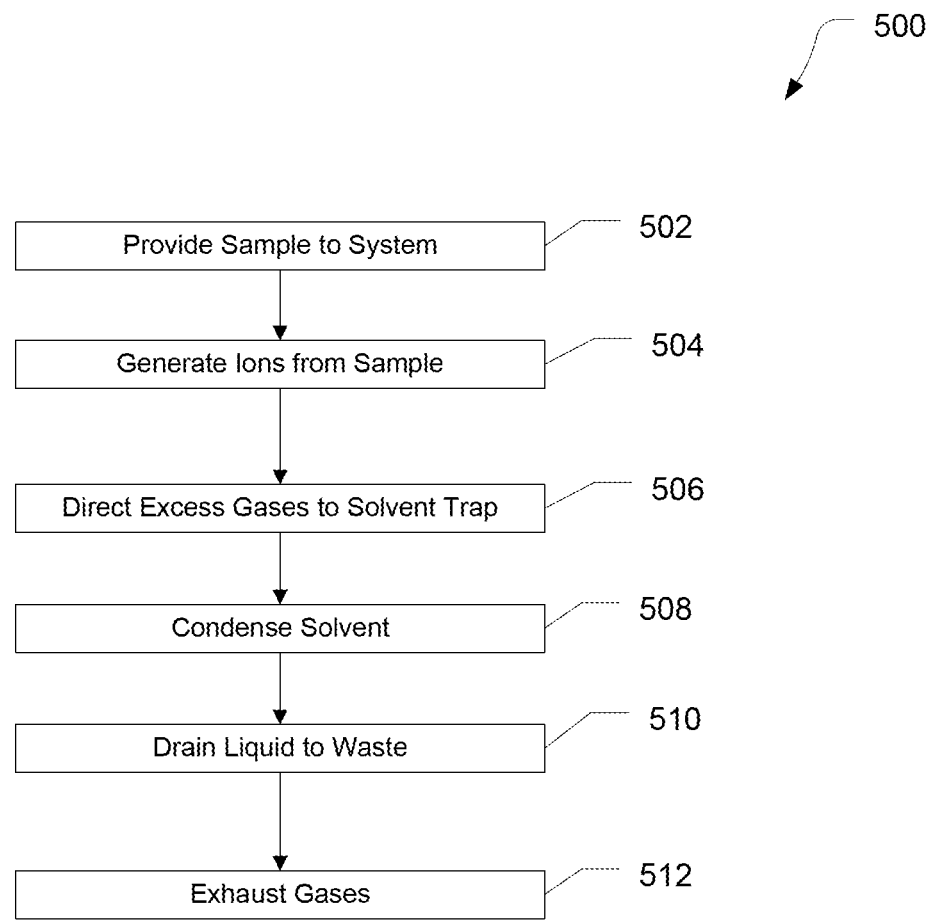
FIG. 5 is a flow diagram illustrating a method of removing volatile solvents from the exhaust gas of an ion source, in accordance with various embodiments.

FIG. 5 illustrates a method 500 of removing volatile solvents from the exhaust gases from an ion source. At 502, a sample can be provided to the system. In various embodiments, the sample can be dissolved in a solvent, such as water, methanol, acetonitrile, isopropanol, formic acid (0.1-1.0%), acetic acid (0.1-1.0%), trifluoroacetic acid (0.05-0.2%), and the like. At 504, the sample can be ionized, such as in an ion source. In various embodiments, the solution containing the sample and the solvent can be vaporized and the sample molecules can be ionized, such as by electrospray ionization, atmospheric-pressure chemical ionization, and other ionization techniques known to one skilled in the art.

At 506, excess gases from the ionization can be directed to an internal solvent trap, such as solvent trap 204 of FIG. 2. The excess gases can include gases used to direct the sample solution, desolvate the sample ions, and the like, and can include evaporated solvent and other components of the sample solution. In various embodiments, the tubing connecting the ion source with the solvent trap can generally slope downward to the solvent trap to avoid pooling of condensed solvent in the tubing.

At 508, the solvent trap can condense at least a portion of the solvent from the exhaust gases. In various embodiments, the solvent trap may use an active cooling mechanism, such as a thermoelectric cooler, a heat exchanger cooled with a circulating coolant, and the like, to cool the exhaust gases to cause the solvent to condense. In other embodiments, the solvent trap can use passive cooling mechanisms to remove heat from the exhaust gases. For example, the solvent trap may be constructed with cooling fins and be cooled by air circulating through the mass spectrometer system. In other embodiments, the solvent trap may include an inlet to draw cool air or other gases to be mixed with the exhaust gases to lower the temperature and condense the solvent.

At 510, the liquid can be collected and drained to a waste container. The internal volume of the solvent trap can be constructed to guide the condensed solvent towards a liquid outlet that can be connected to a waste container by tubing. In various embodiments, the collected liquid can flow, such as under the influence of gravity, through the tubing to the waste container.

At 512, the exhaust gases can be vented from the system. In various embodiments, the exhaust gases may be directed out of the system and to an appropriate air handling system, such as a fume hood, exhaust fan, and the like.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

What is claimed is:

1. A solvent trap for integration with a mass spectrometry system, comprising:
    an enclosure defining an internal space;
    a wet gas inlet port configured to receive a gaseous flow from an ion source;
    a liquids outlet port configured to enable liquids to flow under gravity from the internal space; and
    a dry gas outlet port configured to exhaust gas from the internal space.

2. The solvent trap of claim 1 further comprising baffles within the internal space.

3. The solvent trap of claim 1 further comprising an active cooling mechanism.

4. The solvent trap of claim 3 wherein the active cooling mechanism includes a thermoelectric cooler, a circulating coolant, or any combination thereof.

5. The solvent trap of claim 1 further comprising a passive cooling mechanism.

6. The solvent trap of claim 1 further comprising an inlet for a cooling gas to mix with the wet gas.

7. The solvent trap of claim 1 further comprising a coalescing media.

8. The solvent trap of claim 1 further comprising a sensor to measure a volume of accumulated liquid within the solvent trap.

9. A mass spectrometry system comprising:
    a source configured to generate ions from a liquid sample;
    a mass analyzer configured to determine the mass-to-charge ratio of the ions; and
    a solvent trap including:
        an enclosure defining an internal space;
        a wet gas inlet port configured to receive a gaseous flow from an ion source;
        a liquids outlet port configured to enable liquids to flow under gravity from the internal space; and
        a dry gas outlet port configured to exhaust gas from the internal space.

10. The system of claim 9 wherein the source includes an electrospray source, an APCI source, or a thermospray ion source.

11. The system of claim 9 further comprising baffles within the internal space.

12. The system of claim 9 further comprising an active cooling mechanism.

13. The system of claim 9 further comprising a passive cooling mechanism.

14. The system of claim 9 further comprising an inlet for a cooling gas to mix with the wet gas.

15. The system of claim 9 further comprising a sensor to measure a volume of accumulated liquid within the solvent trap.

16. A method for operating a mass spectrometer, comprising:
    supplying a liquid sample to an ion source;
    nebulizing the liquid sample;
    exhausting excess gases saturated with solvent from the liquid sample to an integrated solvent trap, the integrated solvent trap including an internal volume, a first gaseous inlet, a gaseous outlet, and a liquids outlet;
    separating at least a portion of the solvent from the excess gases within the internal volume;
    draining the portion of the solvent in liquid form from the internal volume by way of the liquids outlet;
    exhausting the excess gases from the internal value by way of the gaseous outlet.

17. The method of claim 16 further comprising actively cooling the excess gas to condense the solvent.

18. The method of claim 17 wherein actively cooling includes using a thermoelectric cooler, circulating a coolant, or any combination thereof.

19. The method of claim 16 further comprising measuring a volume of accumulated liquid within the solvent trap.

20. The method of claim 16 further comprising mixing the excess gases with a cooling gas to condense the solvent.

* * * * *